United States Patent [19]

Koch

[11] Patent Number: 4,723,303
[45] Date of Patent: Feb. 2, 1988

[54] METHOD OF AND CIRCUIT ARRANGEMENT FOR MEASURING THE QUALITY OF RADIO-TRANSMISSION CHANNELS OF A RADIO-TRANSMISSION SYSTEM

[75] Inventor: Wolfgang Koch, Heroldsberg, Fed. Rep. of Germany

[73] Assignee: U.S. Philips Corporation, New York, N.Y.

[21] Appl. No.: 851,836

[22] Filed: Apr. 14, 1986

[30] Foreign Application Priority Data

Apr. 15, 1985 [DE] Fed. Rep. of Germany ....... 3513361

[51] Int. Cl.$^4$ .................. H01J 9/06; H04B 17/00
[52] U.S. Cl. ........................ 455/67; 455/226; 455/303; 455/52; 324/57 N
[58] Field of Search ............ 455/63, 67, 52, 62, 455/56, 57, 303, 226; 324/57 N

[56] References Cited

U.S. PATENT DOCUMENTS

| | | | |
|---|---|---|---|
| 3,605,029 | 6/1969 | Freedman | 455/303 |
| 3,737,781 | 6/1973 | Deerkoski | 324/57 N |
| 4,124,818 | 11/1978 | Lin et al. | 455/226 |
| 4,125,809 | 11/1978 | Mott | 455/67 |
| 4,185,242 | 1/1980 | Schaible | 324/57 N |
| 4,358,738 | 11/1982 | Kahn | 455/67 |

Primary Examiner—Robert L. Griffin
Assistant Examiner—Curtis Kuntz
Attorney, Agent, or Firm—Thomas A. Briody; Jack Oisher; William J. Streeter

[57] ABSTRACT

Method and apparatus for measuring the quality of the radio transmission channels during the transmission in progress, and for recording co-channel interferences, fast fluctuations caused by interferences are separated from slow fluctuations caused by fading, are measured and a quality indicator is derived from the test values of fast and slow fluctuations. By means of the separate measurement of the sum of the power of the receiver input noise and the power of co-channel noise sources it is possible to effect in a simple way and manner a selection of the stationary station having the best receiving condition.

7 Claims, 5 Drawing Figures

METHOD OF AND CIRCUIT ARRANGEMENT FOR MEASURING THE QUALITY OF RADIO-TRANSMISSION CHANNELS OF A RADIO-TRANSMISSION SYSTEM

BACKGROUND OF THE INVENTION

1. Field of the Invention

The invention relates to a method of measuring the quality of radio-transmission channels of a radio-transmission system.

The received field strength is often used to measure the quality of radio-transmission channels, more specifically for registering interference within the useful information.

Such a quality measuring method as the disadvantage that a measure of the interferences produced can only then be obtained when the power of the HF-noise signal can be considered as being constant. However, in a radio-transmission system this assumption is usually not valid. On the one hand the noise power of the receiver input noise changes in response to temperature fluctuations and on the other hand external noise sources such as, for example, co-channel transmitters (such as they can be present in a cellular radio-transmission system) cause a varying HF noise power. These noise powers which significantly fluctuate in mobile radio stations result in conditions such that the field strength is not suitable for use as a quality indicator, particularly in interference-limited cellular radio networks.

2. Description of the Prior Art

DE-AS No. 27 38 800 discloses a radio message transmission system with frequency and/or phase modulation, in which the amplitude fluctuations caused by interferences in the RF-sub-carrier signal are used for quantitively registering the interference. A comparatively constant power of the received useful signal is a prerequisite. In radio transmission systems including mobile radio stations, amplitude fluctuations occur however in response to fading and radio masking, which are present with the same order of magnitude both in good receiving conditions and also in poor receiving conditions, so that measuring the amplitude fluctuations of the RF-carrier signal is not suitable for use as a quality indicator.

From Jakes, Microwave Mobile Communications, John Wiley, 1974, it is known to determine the signal-to-noise ratio in the base band after demodulation. In this situation the noise outside the useful band is measured (out-of-band noise), this measurement often not being suitable for use in bandwidth-efficient digital modulation methods as the band of the low-frequency useful signals is not or is hardly limited. The signal-to-noise ratio in the baseband after the demodulation is often also not ascertainable in a digital radio transmission system.

In addition, DE-AS No. 26 12 476 discloses a radio telephone system in which a signal-to-noise interval measurement is effected, using a test tone. In this disclosure the LF-signal-to-noise ratio is measured with the aid of the pilot tone (test tone) located above the useful frequency band, no signal being transmitted during the transmission of the pilot tone in the useful LF-band, so that the noise power can be measured.

This method of quality measurement has however the disadvantage that during a message transmission in progress no noise measurements can be effected.

Additionally, IEEE Journal of Selected Areas in Communications, Vol. SAC-2, No. 4, July 1984, "Digital Portable Transceiver Using GMSK Modems and ADM Codec," H. Suzuki et al, describes a method of quality measurement in which the jitter of the received RF carrier is used for noise measurement.

However, this method can only be used in coherent demodulation methods in which the carrier is tracked phase-synchronously in the receiver. Modulation methods of this type are however not yet suitable for use in radio transmission systems comprising fast moving radio stations, and with higher carrying frequencies.

In addition, in the digital transmission of the message the jitter of the received and recovered binary signal is often used as a measure of the quality.

Such a method of quality measurement has however the disadvantage that in contemporary digital radio transmission systems with bandwidth-efficient modulation methods such as TFM or GMSK, the clock jitter alone is difficult to access. Especially in rapidly moving receivers a basic jitter is already produced by "random FM". Particularly at higher data rates the jitter is therefore not suitable for judging the receiving quality.

The invention has for its object to measure in a simple way and manner the quality of the radio-transmission channel during the transmission in progress, in a frequency or/and phase modulated-carrier radio transmission system. During the quality measurement also the value of co-channel transmission interferences, such as they may occur in a cellular radio transmission system, must be determined and the method of measuring the quality must be independent of the modulation method used in the radio transmission system.

SUMMARY OF THE INVENTION

The method according to the invention of measuring the quality can advantageously be used in selecting the radio transmission channel having the best transmission conditions. The method is also suitable for use in diversity reception. The method according to the invention has the advantage that the test values are already obtained from signals on the HF-plane, so that for quality measurement in each of the diversity branches only a low cost and modest design effort is required. In the decoding method the measure obtained during the quality measurement can also be used as additional information.

The circuit arrangement for putting the method into effect is of a simple structure and only a low additional circuit cost and design effort is required in the mobile radio stations.

The invention will now be described in greater detail by way of example with reference to an embodiment shown in the drawing.

DESCRIPTION OF THE PREFERRED EMBODIMENT

Figure 1:
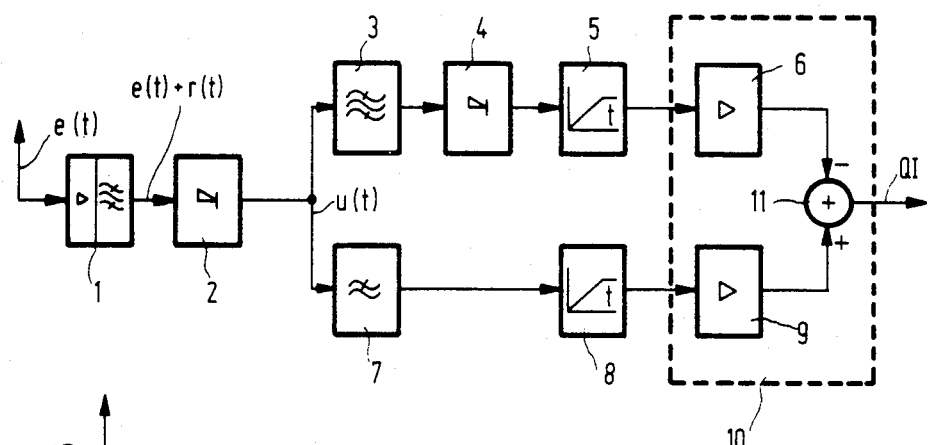
FIG. 1 is a block circuit diagram of the circuit arrangement used in the method according to the invention.

FIG. 1 shows an embodiment of a circuit arrangement for implementing the method according to the invention. The input signal e(t) received from the antenna is applied to a receiver input stage 1. The receiver input stage 1 includes an amplifier, optionally a mixer stage, and also a band-pass filter subsequent thereto. A signal occurring at the output of the receiver input stage 1 is applied to a first AM-demodulator 2. The output signal u(t) of this demodulator is proportional to the envelopes of the complex sum of the receiver input voltage (input signal) e(t) and a receiver input noise r(t).

To determine the power of the noise signal, the voltage signal u(t) is applied to a bandpass filter. The bandpass filter 3 is connected to a second AM demodulator 4, which produces the envelope of the signal thus filtered. The second AM demodulator 4 is connected to a short-time integrator 5, which takes the root-mean square value of the envelope of the filter signal. A measure of the power of the control signal can be taken from the output of the short-time integrator 5.

To determine the power of the useful signal the voltage signal u(t) is applied to a low-pass filter 7. When the cut-off frequency of the low-pass filter 7 is chosen appropriately, the power of the noise signal is significantly attenuated, while the power of the useful signal is little changed. The low-pass filter 7 is connected to a short-time integrator 8, which takes the root-mean square value of the applied signal. A measure of the power of the useful signal can be taken from the output of the short-time integrator 8.

The output signals of the two short-time integrators 5, 8 are applied to a combining circuit 10. In a preferred embodiment (as shown in FIG. 1) the combining circuit 10 is constituted by two logarithmic amplifiers 6, 9 and an arrangement 11 for forming the difference between the output signals of the two logarithmic amplifiers 6, 9. A quality indicator QI which is a measure of the level of the power ratios between the useful and noise signals within a time interval whose length corresponds to the integration period of the short-time integrators 5 or 8, can be taken from the output of the combining circuit 10.

When the filters are appropriately dimensioned, that is to say the bandpass filter 3 and the low-pass filter 7, it can be provided that the output signal of the combining circuit 10 is proportional in a wide range to the level of the signal-to-noise ratio. The cut-off frequencies must be chosen such that the condition $$\text{Min } \{f_{TP}, f_{BPu}\} > 2 f_{Dmax} \tag{1}$$

is satisfied. Herein $f_{TP}$ is the cut-off frequency of the low-pass filter 7, $f_{BPU}$ is the lower cut-off frequency of the bandpass filter 3 and $f_{DMAX}$ is the maximum Doppler frequency. The maximum Doppler frequency $f_{Dmax}$ is determined from the maximum velocity $v_{max}$ of the receiver and the wavelength $\lambda$ at the carrier frequency $$f_{Dmax} = V_{max}/\lambda \tag{2}$$

As often significant power portions of the useful signal still occur up to 6-fold the maximum Doppler frequency $f_{Dmax}$ (see FIG. 4) the filters are dimensioned such that the lowest frequency of $f_{BPu}$ or $f_{TP}$ is not located below 6 times the maximum Doppler frequency $f_{Dmax}$.

The choice of the integration period T of the short-time integrators 5, 8 is based on the use of the method according to the invention. For diversity reception or for the extraction of secondary information for channel decoder methods the integrator period T is selected in accordance with the following formula $$T << \tfrac{1}{f_{Dmax}} \tag{3}$$

For selecting a stationary radio station having the best receiver conditions a significantly longer integration period T is required.

The embodiment shown in FIG. 1 is only one of a plurality of embodiments. If no high requirements are imposed on the measuring accuracy then the circuit arrangement as shown in FIG. 1 can be implemented with simple means. It is, for example, possible to use for the second AM demodulator 4 and for the short-time integrator 5 a circuit arrangement constituted by a rectifier and a subsequent RC network. The linear mean then taken is a measure for taking the square mean when the amplitude statistic of the input signal is known.

By modifying the circuit arrangement shown in FIG. 1 other quality indicators QI can also be obtained. It is, for example, possible by substituting a linear averaging operation for taking the root-mean square value in the short-time integrator 8 to determine the useful voltage-noise power ratio required for diversity reception.

Figure 2:
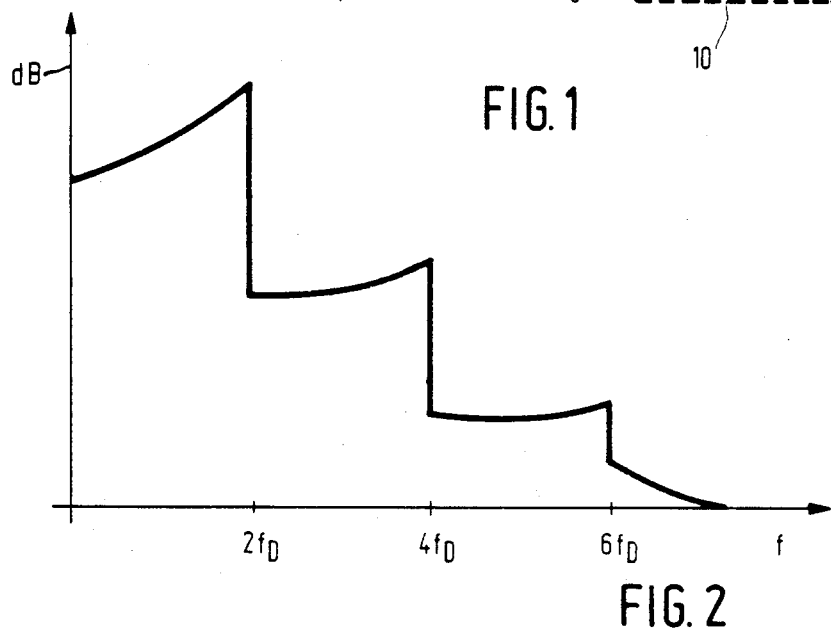
FIG. 2 shows the power density spectrum of the receiving field strength in a mobile receiver arrangement.

For the recognition on which the invention is based, that in the event of co-channel interferences the spectrum is substantially white, the associated theoretical condition will be obtained with reference to the FIGS. 2 to 5. The spectrum of the envelope of the useful signal has above a given frequency no power portions worth mentioning anymore. In mobile receivers the spectrum clearly decreases at a multiple of twice the Doppler frequency $f_D$. FIG. 2 shows the power density spectrum of the receiving field strength in a mobile receiver arrangement. In addition, it is known that the receiver input noise r(t) can be described as being a signal with gaussian instantaneous value distribution and a constant line density spectrum within the HF bandwidth of interest.

Figure 3:
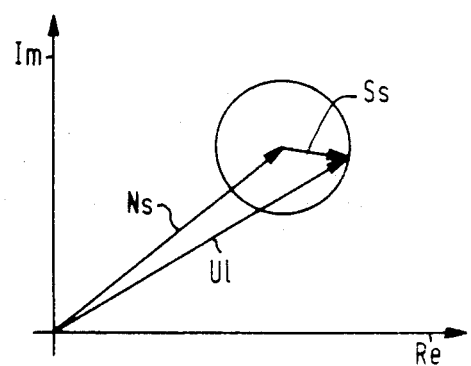
FIG. 3 shows the superimposition of useful and noise signals in a vector diagram.

FIG. 3 shows the vectorial addition of the two signals (useful and noise signal) in the complex plane. The measured field strength is proportional to the amount of the resultant vector. At a sufficiently high signal-to-noise ratio the spectrum of this measuring signal is ultimately equal to the addition of the power density spectra of the useful field strength and the input noise. As below a certain signal-to-noise ratio the power portion of the useful field strength at higher frequencies is so small as being disregarded, bandpass filtering (in the bandpass filter 3) can produce a signal whose power is a measure of the power of the total overall noise signal.

Similar conditions occur at co-channel interferences. In this case the receiver input voltage e(t) is obtained from vectorially adding the voltage of the useful signal and the voltage of the noise signal together. If a short time interval is considered in which the envelope of both signals change only to an insignificant extent, then the envelope of the resultant signal (=amount of the corresponding vector) evidences fluctuations whose amplitude corresponds to the amplitude of the noise signal. The rate at which the noise signal changes directly depends on the difference between the instantaneous frequencies of the useful and the noise signals. As both signals are subjected to the same transmission conditions and are modulated asynchronously, this difference (it being assumed that the carrier frequencies are the same) can fluctuate between 0 and twice the frequency swing.

The spectrum of the amplitude fluctuations resulting therefrom can be determined separately in a given modulation method and it being assumed that the baseband signals are statistically independent, for the useful signal and the noise signal, so that from the power in a predetermined frequency band the total noise power can be deduced. In the method according to the invention it is consequently also possible to measure co-channel interferences when the spectrum of the resulting envelope is significantly wider than the spectrum of the useful field strength. This condition is generally satisfied when it holds for the frequency swing that:

$$H >> 2f_D \qquad (4)$$

Figure 4:
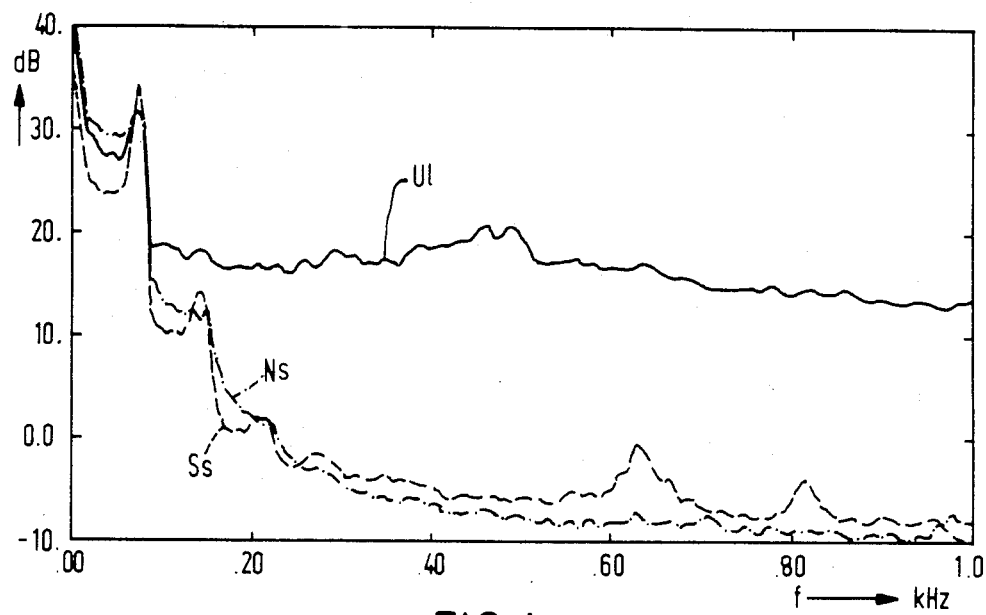
FIG. 4 shows the power density spectra of field strength signals in the event of co-channel interference, recorded during a test run

FIG. 4 shows the power density spectrum recorded during a test run. This spectrum was measured at a COS-FFSK modulation, at a 3.6 kHz swing, at 948 MHz and at a vehicle velocity of 42 km/h. The increased power proportion at high frequencies for the superposition of the useful signal and the noise signal is clearly recognizable.

Figure 5:
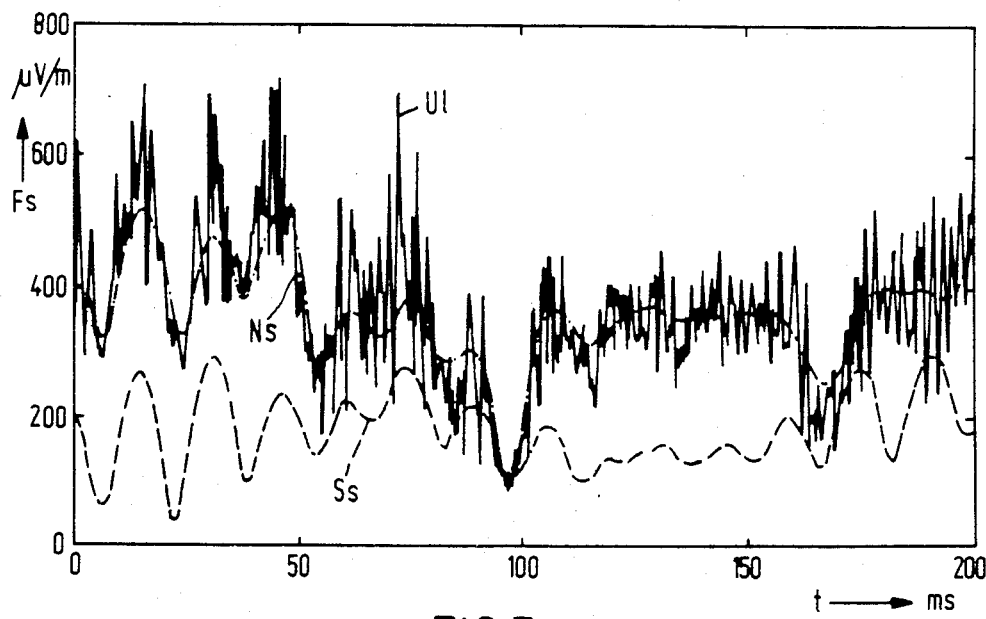
FIG. 5 shows the variation in time of the field strength in the event of co-channel interferences.

FIG. 5 shows the variation versus time of the field strength for 2 m of the test run in accordance with FIG. 4. In the superpositioning both the fast fluctuations of the field strength caused by the co-channel noise signal and also the slow fluctuations of the field strength caused by fading of the useful signal can be recognised.

What is claimed is:

1. A circuit arrangement for indicating the quality of radio transmission channels comprising a receiver input stage, a first AM-demodulator connected to said receiver input stage and having an output, a first series arrangement of a bandpass filter, a second AM-demodulator and a first short-time integrator connected to the output of said first AM-demodulator, a second series arrangement of a low-pass filter and a second short-time integrator, said low pass filter having an input connected to the output of said first AM-demodulator, and a combining circuit connected to the outputs of said first and second short-time integrators to provide a quality indicator for indicating the quality of said transmission channels.

2. The invention of claim 1 wherein the combining circuit comprises first and second logarithmic amplifiers for amplifying signals from said first and second short-time integrators and an arrangement for forming the difference between the output signals of said first and second logarithmic amplifiers, said difference being useful as said quality indicator.

3. A method of measuring the quality of radio transmission channels of a radio transmission system which includes stationary and mobile radio stations which communicate over radio frequency channels by frequency or phase modulating a high-frequency carrier comprising:
   amplitude demodulating said high frequency carrier signal;
   filtering said demodulated high frequency carrier signal with first and second filters to produce a first signal representing slow amplitude fluctuations of said carrier signal resulting from fading of said carrier signal, and a second signal representing fast fluctuations caused by one or more interference signals;
   averaging each of said first and second signals; and,
   combining averaged first and second signals to produce a quality indicator signal from said first and second signals representing said fading and interference.

4. A method as claimed in claim 3, wherein power ratios of the fast to the slow fluctuations of said first and second signals are measured.

5. A method as claimed in claim 3, wherein the linear mean value of the slow fluctuations of said first signal are measured and are made proportional to the root-mean square value of the fast fluctuations of said second signal 6. A circuit for indicating the quality of a radio transmission channel:
   a receiver input stage connected to said radio transmission channel;
   a first amplitude demodulator connected to an output of said input stage;
   a bandpass filter connected to receive a demodulated signal from said amplitude demodulator;
   a low pass filter connected to receive said demodulated signal from said amplitude demodulator;
   a second AM demodulator and short term integrator serially connected with said bandpass filter;
   a second short term integrator connected to said low pass filter, whereby separated fast and slow fluctuations of said demodulated signal are produced from each of said integrators; and,
   a combining circuit for combining signals from said first and second short term integrators to produce a quality indicator QI.

7. A circuit arrangement as claimed in claim 6, wherein the combining circuit comprising two logarithmic amplifiers and an arrangement for forming the difference between the output signals of the two logarithmic amplifiers.

* * * * *